US006418172B1

(12) United States Patent
Raghavan et al.

(10) Patent No.: US 6,418,172 B1
(45) Date of Patent: Jul. 9, 2002

(54) LOOK-AHEAD MAXIMUM LIKELIHOOD SEQUENCE ESTIMATION DECODER

(75) Inventors: Sreen A. Raghavan, La Jolla; Hari Thirumoorthy, San Diego, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/296,086

(22) Filed: Apr. 21, 1999

(51) Int. Cl.$^7$ .................................................. H04L 5/12
(52) U.S. Cl. ........................ 375/262; 375/265; 375/341; 714/794; 714/795
(58) Field of Search ................................ 375/261, 262, 375/265, 340, 341; 714/794, 795, 796

(56) References Cited

U.S. PATENT DOCUMENTS

| 4,456,893 A | 6/1984 | Otani ........................... 333/18 |
| 4,701,936 A | 10/1987 | Clarke et al. .................. 375/14 |
| 4,888,560 A | 12/1989 | Ogura ........................ 330/254 |
| 4,974,185 A | 11/1990 | Ohno et al. .................. 364/724 |
| 5,031,194 A | 7/1991 | Crespo et al. .............. 375/233 |
| 5,119,196 A | 6/1992 | Ayanoglu et al. ........... 358/167 |
| 5,245,291 A | 9/1993 | Fujimura ..................... 324/617 |
| 5,291,499 A | 5/1994 | Behrens et al. .............. 371/43 |

(List continued on next page.)

FOREIGN PATENT DOCUMENTS

| DE | DE 19626076 A1 | 1/1997 | .......... H03M/13/12 |
| EP | 0410399 A2 | 1/1991 | ............ H04N/5/44 |
| JP | 2-215236 | 8/1990 | ........... H04B/7/005 |
| JP | 6-334692 | 12/1994 | ........... H04L/25/08 |
| JP | 8-172366 A | 2/1996 | .......... H03M/13/12 |
| JP | 8-116275 | 5/1996 | .......... H03M/13/12 |
| JP | 9-148944 | 6/1997 | .......... H03M/13/12 |
| JP | 09-153845 | 6/1997 | ............ H04B/3/04 |
| WO | WO 97/11544 | 3/1997 | ........... H04L/25/03 |

OTHER PUBLICATIONS

Institute of Electrical and Electronics engineers, New York, "IEEE Standards for Local and Metropolitan Area Networks," IEEE Standard 802.3u–1995 CSMA/CD Access Method, Type 100Base–T (1995).

American National Standard for Information Systems, "fibre Distributed Data Interface (FDDI)–Part: Token Ring Twisted Pair Physical Layer Medium Dependent (TP–PMD)," ANSI X3.263:199X (1995), pp. 239–329.

(List continued on next page.)

Primary Examiner—Stephen Chin
Assistant Examiner—Dac V. Ha
(74) Attorney, Agent, or Firm—Skjerven Morrill LLP; Gary J. Edwards

(57) ABSTRACT

A Nearest Neighbors Look-Ahead Maximum Likelihood Estimation Sequence (LA-MLSE) algorithm for decoding data in a digital communications system forms the following three vectors to decode data: (1) a vector of the encoder input bit signals $A=A\{k, k+1, k+2\}$, (2) a vector of the noise-free encoder channel output signals $Y=Y\{A(k), A(k+1), A(k+2)\}$; and (3) a vector of the received signals $R=R(A(k), A(k+1), A(k+2))$. If the distance between the received signal R and at least one of the channel output vectors which are of the form $Y\{1, A(k+1), A(k+2)\}$ is shorter than the distance between the received signal R and the Nearest Neighbor of the signal $Y\{1, A(k+1), A(k+2)\}$, then A(k) is decoded as 1. In an All Neighbors Look-Ahead MLSE algorithm, A(k) is decoded as 1 only if the distance between the received signal R and at least one of the channel output vectors which are of the form $Y\{1, A(k+1), A(k+2)\}$ is shorter than all the distances between signal R and each of the channel output vectors which are of the form $Y\{0, A(k+1), A(k+2)\}$. In a Nearest Neighbor Adjusted Depth Look-Ahead MLSE algorithm, if the distance obtained using the first two time indices, i.e. k and k+1, is greater than a minimum distance, the time index k+2 is omitted from the calculations, thereby reducing the amount of computations necessary to estimate the value of the encoder input data.

41 Claims, 7 Drawing Sheets

U.S. PATENT DOCUMENTS

| | | | |
|---|---|---|---|
| 5,465,272 A | | 11/1995 | Smith .......................... 375/295 |
| 5,481,564 A | | 1/1996 | Kakuishi et al. ............. 375/230 |
| 5,502,735 A | | 3/1996 | Cooper ........................ 371/43 |
| 5,602,507 A | * | 2/1997 | Suzuki ........................ 329/304 |
| 5,617,450 A | | 4/1997 | Kakuishi ..................... 375/230 |
| 5,638,065 A | * | 6/1997 | Hassner et al. ............... 341/59 |
| 5,654,667 A | | 8/1997 | Adachi ........................ 329/306 |
| 5,809,079 A | | 9/1998 | Hayashi ....................... 375/262 |
| 5,818,378 A | | 10/1998 | Cheng et al. ................ 341/155 |
| 5,841,478 A | | 11/1998 | Hu .............................. 348/426 |
| 5,841,484 A | | 11/1998 | Hulyalkar et al. ........... 348/607 |
| 5,859,861 A | | 1/1999 | Oh .............................. 371/43.7 |
| 5,872,668 A | | 2/1999 | Muto ........................... 360/65 |
| 5,895,479 A | | 4/1999 | Suganuma ................... 708/301 |
| 5,909,384 A | | 6/1999 | Tal et al. ................. 364/724.19 |
| 5,940,442 A | | 8/1999 | Wong et al. ................. 375/232 |
| 5,949,819 A | | 9/1999 | Bjarnason et al. ........... 375/222 |
| 5,960,011 A | | 9/1999 | Oh .............................. 371/46 |
| 5,982,818 A | * | 11/1999 | Krueger et al. .............. 375/265 |
| 5,986,831 A | | 11/1999 | Muto ........................... 360/46 |
| 6,035,007 A | * | 3/2000 | Khayrallah et al. ......... 375/341 |
| 6,038,269 A | | 3/2000 | Raghavan .................... 375/340 |
| 6,047,022 A | | 4/2000 | Reuven ........................ 375/222 |
| 6,115,418 A | | 9/2000 | Raghavan .................... 375/233 |
| 6,148,046 A | | 11/2000 | Hussein et al. .............. 375/345 |

OTHER PUBLICATIONS

Institute of Electrical and Electronics engineers, New York, "IEEE Standards for Local and Metropolitan Area Networks," IEEE Standard 802.3u–1995 CSMA/CD Access Method, Type 100Base–T (1995).

IEEE 802.3ab, Gigabit Long Haul Copper Physical Layer Standards Committee, (1997).

* cited by examiner $\bar{R} = \{R(k0), R(k0+1), R(k0+2)\}$ $y_0 = y(0,0,0)$
$y_1 = y(0,0,1)$
$y_2 = y(0,1,0)$
$y_3 = y(0,1,1)$

LOOK-AHEAD MAXIMUM LIKELIHOOD SEQUENCE ESTIMATION DECODER

FIELD OF THE INVENTION

The present invention relates to digital communications and, more particularly, to decoding data using a Near Maximum Likelihood Sequence Estimation.

BACKGROUND OF THE INVENTION

The dramatic increase in desktop computing power driven by intranet-based operations coupled with increased demand for time-sensitive data delivery among users has spurred development of high speed Ethernet local area networks (LANs). 100BASE-TX Ethernet (see IEEE Std. 802.3u-1995 CSMA/CD Access Method, Type 100 Base-T) using existing category 5 (CAT-5) copper wire, and the newly developing 1000BASE-T Ethernet (see IEEE Draft P802.3ab/D4.0 Physical Layer Specification for 1000 Mb/s Operation on Four Pairs of Category 5 or Better Twisted Pair Cable (1000 Base-T)) for Gigabit/s transfer of data over category 5 data grade copper wire, require new techniques in high speed symbol processing.

Conventionally, a single category 5, unshielded, twisted wire pair, with a length varying from 0 meter to 100 meters, is used to transmit data, in accordance with the 100BASE-TX data transmission protocol. Prior to transmission, the data is encoded at the transmitting end and is subsequently decoded at the receiving end. A well known encoding scheme, called MLT-3, is typically used to encode the data (See American National Standard Information system, Fiber Distributed Data Interface (FDDI)—Part: Token Ring Twisted Pair Physical Layer Medium Dependent (TP-PMD), ANSI X3.263:199X). In the MLT-3 encoding scheme, a logic 1 is transmitted as either a −1 or +1 and a logic 0 is transmitted as a 0.

A data signal appearing at time k at the receiving end of a category 5 wire (hereinbelow referred to as the channel) depends not only on the data transmitted at time k, but also on the previously transmitted data and the noise generated in the channel, creating difficulties in decoding the transmitted data.

One method for decoding the MLT-3 encoded, transmitted data is the so-called Delayed Decision Feedback Sequence Estimation(DDFSE) which, in turn, uses the well-known Viterbi algorithm. One disadvantage of the Viterbi algorithm is that it assumes the noise generated in a transmission channel is an additive white Gaussian noise. It is well known, however, that the noise generated in a category 5 100BASE-TX transmission channel is a cross-talk noise which has a different characteristic than the additive white Gaussian noise.

Another disadvantage of the DDFSE algorithm is that it requires additional signal processing steps. Moreover, to obtain acceptable bit error rate (BER)—which is the probability that a bit is decoded erroneously (the IEEE 802.3 specification calls for a BER of less than or equal to 1e–6)—using the Viterbi algorithm, large values of trace-back depth are typically needed, resulting in undesirable increases in the latency, which, in turn, requires more hardware to ensure that the processing of the current data is completed before the arrival of the next data. Furthermore, the DDFSE algorithm requires feedback, precluding the use of pipelining for the processing of the signals.

Moreover, because the Viterbi algorithm uses the well-known trace-back technique, a decoder implementing the Viterbi algorithm requires a relatively large amount of memory, read-write pointers and dual port random access memories, adding to the complexity and the manufacturing cost of the decoder.

Therefore, a need continues to exist for an algorithm for decoding transmitted data that is simple, computationally efficient and inexpensive.

SUMMARY OF THE INVENTION

A Nearest Neighbor Look-Ahead Maximum Likelihood Estimation Sequence (LA-MLSE) algorithm, in accordance with one embodiment of the present invention, decodes the MLT-3 encoded signal at time k—where k denotes the time index—which signal is transmitted via a category 5 transmission channel, by evaluating the signals received at the receiving end at times k, k+1, k+2, etc. The number of the received signals that the algorithm uses to decode is called the "depth" of the LA-MLSE. The algorithm assumes that the transmission channel has a z-transform defined by the expression $(1+\alpha \times z^{-1})$, where $\alpha$ is a number greater than 0 and smaller or equal to 1.

In some embodiments of the present invention, the algorithm uses a depth of 3, in which case, to make the estimation, the algorithm forms the following three vectors: (1) a vector of the encoder input bit signals A=A{k, k+1, k+2}, with A(k), A(k+1) and A(k+2) respectively representing the encoder input bit signals at times k, k+1 and k+2; (2) a vector of the noise-free encoder channel output symbol signals Y=Y{A(k), A(k+1), A(k+2)}, with Y(A(k)), Y(A(k+1)) and Y(A(k+2)) respectively representing the noise-free channel output symbol signals for the corresponding encoder input signals A(k), A(k+1) and A(k+2); and (3) a vector of the received signals R=R(A(k), A(k+1), A(k+2)), with R(A(k)), R(A(k+1)) and R(A(k+2)) respectively representing the received signals for the corresponding encoder input signals A(k), A(k+1) and A(k+2). The algorithm determines the Nearest Neighbor distance for each channel output vector which is of the form Y{1, A(k+1), A(k+2)}, where the Nearest Neighbor distance for each such channel output vector is defined as the shortest of all the distances between that channel output vector and all the other channel output vectors which are of the form Y{0, A(k+1), A(k+2)}, and where the distance between each two vectors is defined as the sum of the square of the differences between the corresponding signals of the two vectors for each of the times k, k+1, and k+2. If the distance between the received signal R and at least one of the channel output vectors which are of the form Y{1, A(k+1), A(k+2)} is shorter than the distance between the received signal R and the Nearest Neighbor of the signal Y{1, A(k+1), A(k+2)}, then A(k) is decoded as 1, otherwise A(k) is decoded as 0.

In an All Neighbors LA-MLSE algorithm, in accordance with another embodiment of the present invention, the algorithm decodes A(k) as 1, only if the distance between the received signal R and at least one of the channel output vectors which is of the form Y{1, A(k+1), A(k+2)} is shorter than all the distances between the signal R and each of the channel output vectors which is of the form Y{0, A(k+1), A(k+2)}, otherwise the algorithm decodes A(k) as 0.

In a Nearest Neighbor Adjusted Depth LA-MLSE algorithm, in accordance with another embodiment of the present invention, the depth parameter is varied to minimize the amount of computation. Therefore, if the distance obtained using the signals received during the first two time indices, i.e. k and k+1, is greater than a minimum distance, the signal received during the time index k+2 is omitted in decoding the encoded signal.

DETAILED DESCRIPTION

The Nearest Neighbor Look-Ahead Maximum Likelihood Estimation Sequence (LA-MLSE) algorithm, in accordance with one embodiment of the present invention, for decoding the MLT-3 encoded data transmitted via a category 5 wire using the 100BASE-TX transmission protocol, is described below.

Figures 1A, 1B:
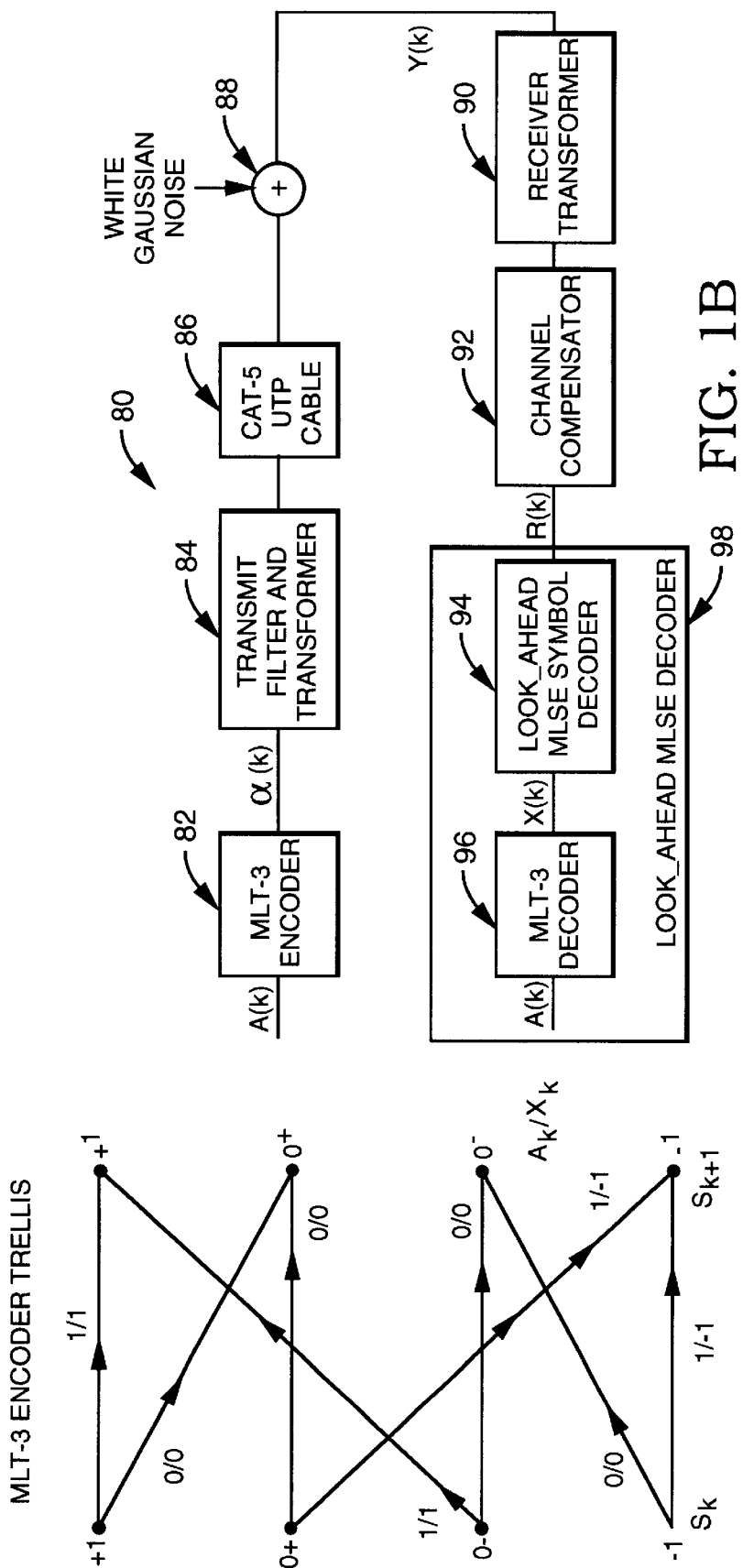
FIG. 1A shows the MLT-3 encoder trellis diagram.
FIG. 1B shows a block diagram of the transceiver system which includes the MLT-3 encoder of FIG. 1A.

FIG. 1A shows a trellis mapping of random data (signal) bits A(k) to MLT-3 encoded symbols X(k), where k denotes the time index. Each data bit A(k) represent a logic data, i.e. 0 or 1 and each X(k) represents a symbol data, i.e. +1, 0 or −1. As is seen from FIG. 1A, if the encoder is in state ($S_k$) +1 and the encoder receives an input bit 1 (i.e., A(k) is 1), the encoder's next state ($S_{k+1}$) is +1 and the encoder generates a +1 (i.e. X(k) is +1). If the present encoder state ($S_k$) is +1 and the encoder receives a 0 (i.e., A(k) is 0), the encoder's next state ($S_{k+1}$) is $0^+$ and the encoder generates a 0 (i.e. X(k) is 0). Other possible encoder state transitions and the encoder output symbols in response to encoder input data are shown in FIG. 1A.

A block diagram of a transceiver for transmission of data using category 5, unshielded, twisted pair (CAT-5 UTP) copper wire is shown in FIG. 1B. Data bits A(k) are encoded using known MLT-3 encoder 82 to generate data symbols X(k).

Assume that the symbols in the symbol set {X(k)} are transmitted by known Transmit Filter and Transformer 84 through known CAT-5 UTP 86 copper wire transmission channel using the 100BASE-TX transmission protocol. Consider a channel with the following z-transform: ("α" represents a number greater than 0 and smaller than or equal to 1, "x" denotes a multiplication operation, and "z" is a complex variable).

$$H(z)=1+\alpha \times z^{-1} \qquad (1)$$

Therefore, the noiseless data appearing at known Receiver Transformer 90 at time k is:

$$Y(k)=X(k)*h(k) \qquad (2)$$

where h(k) represents the time-domain transmission is characteristic of the channel and symbol "*" denotes a time domain convolution operation.

However, CAT-5 UTP 86 is a noisy medium and, accordingly, Receiver Transmitter 90 receives both the noiseless data as well as the noise n(k) generated in the transmission channel, which is shown in FIG. 1B as being introduced to the channel by adder 88 (of-course, no such adder is actually present).

Before being decoded by LA-MLSE decoder 98, the transmitted data pass through Channel Compensator 92. Channel compensator 92 makes the transmission channel appear to have a z-transform as defined by equation (1) above and is described in a U.S. patent application filed by Sreen A. Raghavan, Ser. No. 08/974,450 and incorporated herein by reference. Signal R(k) generated by Channel Compensator 92 at time k is given by:

$$R(k)=Y(k)+n(k) \qquad (3)$$

LA-MLSE decoder 98 includes LA-MLSE symbol decoder 94 and MLT-3 data decoder 96. LA-MLSE symbol decoder 94 receives signal R(k) and generates symbol data X(k) which is decoded to data bits A(k)) by MLT-3 decoder 96.

Assume that the state of the encoder, which encodes logic data A(k) to symbol data X(k), is denoted by S(k) at time k. Because the mapping from A(k) to X(k) is known at any given time, the algorithm estimates X(k), from which A(k) is subsequently recovered (see FIGS. 1A and 1B).

Assume that the noise present in the channel is an independent and identically distributed (IID) Additive White Gaussian Noise (AWGN) and that the channel is a time-invariant system. Broadly stated, the Nearest Neighbor LA-MLSE algorithm estimates X(A(k))—from which A(k)) is decoded—by comparing the Euclidean distance (hereinafter distance) between the received vector R{R(k), R(k+1), . . . R(M)} and each of the noise-free channel output vectors {Y(k), Y(k+2) . . . Y(M)} to the distance between the vector R and the Nearest Neighbor of that vector Y. Depending on whether the first distance is smaller or greater than the second, the decoder decodes A(k) as either 1 or 0. As seen above, A(k) is decoded by looking ahead at the succeeding received signals, i.e. R(k+1), R(k+2), hence the name Look-Ahead MLSE.

The number of signals used to decode A(k) is called the depth of the LA-MLSE. For example, if in decoding A(k), three received signals, i.e. R(k), R(k+1) and R((K+2) are used, the depth of the LA-MLSE is 3.

Table 1, shown below, aids in understanding the principles underlying the Nearest Neighbor LA-MLSE algorithm. In Table 1, it is assumed that at time k, (at which time the encoder input signal is decoded), the encoder is in state +1 (see FIG. 1A); the encoder input bit signals A(k), A(k+1) and A(k+2) of the encoder input signal vector A=A{A(k), A(k+1), A(k+2)} are respectively designated as A0, A1 and A2; the encoder output symbol signals X[A(k)], X[A(k+1)] and X[A(k+2)] of the encoder output signal vector X=X{A (k), A(k+1), A(k+2)} are respectively designated as X0, X1 and X2 and the channel output signals Y[A(k)], Y[A(k+1)] and Y[A(k+2)] of the channel output signal vector Y=Y{A (k), A(k+1), A(k+2)} are respectively designated as Y0, Y1 and Y2. Furthermore it is assumed that the received signals R[A(k)], R[A(k+1)] and R[A(k+2)] of the received signal vector R=R{A(k)), A(k+1), A(k+2)} are respectively designated as signals R0, R1 and R2.

TABLE 1

Encoder State = +1

| Encoder input signals A0, A1, A2 | Encoder output signals X0, X1, X2 | | | Channel output signals Y0, Y1, Y2 | | | Nearest Neighbor Distance |
|---|---|---|---|---|---|---|---|
| 0 0 0 | 0 | 0 | 0 | $\alpha$ | 0 | 0 | |
| 0 0 1 | 0 | 0 | −1 | $\alpha$ | 0 | −1 | |
| 0 1 0 | 0 | −1 | 0 | $\alpha$ | −1 | −$\alpha$ | |
| 0 1 1 | 0 | −1 | −1 | $\alpha$ | −1 | −(1 + $\alpha$) | |
| 1 0 0 | 1 | 0 | 0 | 1 + $\alpha$, | 0 | 0 | 1 + $\alpha^2$ |
| 1 0 1 | 1 | 0 | −1 | 1 + $\alpha$, | $\alpha$, | −1 | 1 + $\alpha^2$ |
| 1 1 0 | 1 | 1 | 0 | 1 + $\alpha$, | 1+ $\alpha$, | 0 | 1 + (1 + $\alpha$)$^2$ + $\alpha^2$ |
| 1 1 1 | 1 | 1 | 1 | 1 + $\alpha$, | 1+ $\alpha$, | 1 + $\alpha$, | 1 + 2 × (1 + $\alpha$)$^2$ |

Column 1 of Table 1 lists all possible permutations of three input data bits A and column 2 lists the corresponding MLT-3 encoded symbols X. It is noted that in determining the values of X0, X1 and X2, listed in columns 2, the encoder state, i.e. +1, is either known or is estimated in accordance with well known techniques (see "The Viterbi Algorithm", G. D. Forney, Proceedings of the IEEE, Vol. 61, No. 3, March 1973) and which is briefly explained below for the LA-MLSE algorithm.

Assume that the decoder and the encoder are initially in different states (i.e. the decoder is in an incorrect state.) On the average, the Euclidean distance (defined below) between the received signal vector R and the correct transmitted signal vector Y is shorter than the distance between the received signal vector R and any other vector Y, allowing the decoder state to slowly converge to the encoder state within a few data symbols. After the convergence, the decoder traces the encoder state sequence except for the error introduced by the noise. An example of the convergence is described below.

Assume that the encoder transmits MLT-3 symbols (i.e. X(A(k)) +1 for a sufficiently long duration and thus the encoder traces the state sequence +1, +1, +1, . . . , +1. Assume, further, that the decoder is initially in the state −1 and that there is no noise in the channel, i.e. n(k) is zero and thus R(A(k)) is equal to Y(A(k)). As is seen from the following Table (i), the decoder converges to the encoder state within 3 symbols. Observe that the path (see FIG. 1) having the smallest Euclidean distance leads to the convergence.

TABLE i

| Time step | k | k + 1 | k + 2 | k + 3 |
|---|---|---|---|---|
| Encoder State (symbols) | +1 (+1) | +1 (+1) | +1 (+1) | +1 (+1) |
| Paths compared | −1 to 0$^-$ and −1 to −1 | 0$^-$ to +1 and 0$^-$ to 0$^-$ | +1 to +1 and +1 to 0$^+$ | |
| Euclidean distances | $(Y(1) - (1 + \alpha))^2$ and $(Y(1) + \alpha)^2$ | $(Y(2) - 1)^2$ and $(Y(2) - 0)^2$ | $(Y(3) - (1 + \alpha))^2$ and $(Y(3) - \alpha)^2$ | |
| Decoder State | −1 | 0$^-$ | +1 | +1 |

In determining the values of the channel output bits Y0, Y1 and Y2, it is assumed that the z-transform of the channel is governed by equation (1) shown above. The procedure for determining the channel output signals Y0, Y1 and Y2 is well known and is shown below when the encoder output signals X0, X1 and X2 (i.e., X(A(k)), X(A(k+1)), X(A(k+2))) are respectively 0, −1 and −1.

Because the channel z-transform is $1+\alpha \times z^{-1}$, the channel has an impulse response defined by:

$$h(0)=1 \text{ and } h(1)=\alpha$$

Furthermore, because the encoder is in state +1, the encoder output signal X(A(k−1)) is also +1. Therefore, $$Y(A(k))=h(0)\times X(A(k))+h(1)\times X(A(k-1))=1\times 0+\alpha\times 1=\alpha$$

$$Y(A(k+1))=h(0)\times X(A(k+1))+h(1)\times X(A(k))=1\times -1+\alpha\times 0=-1$$

$$Y(A(k+2))=h(0)\times X(A(k+2))+h(1)\times X(A(k+1))=1\times -1+\alpha\times -1=-1-\alpha$$

Column 4 of Table 1 lists, for each channel output vector of the form Y{1, A(K+1), A(K+2)}, the shortest of all the distances—hence the term Nearest Neighbor Distance—between that channel output vector and all the other channel output vectors which are of the form Y{0, A(K+1), A(K+2)}. The determination of the Nearest Neighbor distance for the channel output vector Y{1, 0, 0} is shown below. The distance between Y{1, 0, 0} and Y{0, 0, 0} is equal to:

$$[(1+\alpha)-(\alpha)]^2+[\alpha-0]^2+[0-0]^2=1+\alpha^2;$$

the distance between Y{1, 0, 0} and Y{0, 0, 1} is equal to:

$$1+2\times\alpha^2;$$

the distance between Y{1, 0, 0} and Y{0, 1, 0} is equal to:

$$2\times\alpha^2+(1+\alpha)^2;$$

and the distance between Y{1, 0, 0} and Y{0, 1, 1} is equal to:

$$2\times\alpha^2+(1+\alpha)^2.$$

As seen from the above calculations, because $\alpha$ is between 0 and 1, the distance between the vectors Y{1, 0, 0} and Y{0, 0, 0}, i.e. $1+\alpha^2$, is shorter than the other three distances shown. Therefore, the Nearest Neighbor vector to vector Y{1, 0, 0} is the vector Y{0, 0, 0} and hence the Nearest Neighbor distance to vector Y{1, 0, 0} is $(1+\alpha^2)$, as shown in Table 1.

Similarly, the Nearest Neighbor vectors to vectors Y{1, 0, 1}, Y{1, 1, 0} and Y{1, 1, 1} are respectively vectors Y{0, 0, 1}, Y{0, 0, 0} and Y{0, 0, 0}.

A similar calculation (not shown) indicates that that the Nearest Neighbor distances for the channel output vectors Y{1, 0, 1}, Y{1, 1, 0} and Y{1, 1, 1} are respectively equal to $(1+\alpha^2)$, $[(1+(1+\alpha)^2+\alpha^2)]$ and $[1+2\times(1+\alpha)^2]$.

Accordingly, assuming a depth of 3 and assuming an encoder state of +1, the Nearest Neighbor LA-MLSE algorithm decodes a 1 if at least one of the following four conditions (i–iv) are true, namely if:

(i) the distance between vectors R{R0, R1, R2} and Y{1, 0, 0} is shorter than that between vectors R{R0, R1, R2} and Y(0, 0, 0) or if (ii) the distance between vectors R(R0, R1, R2) and Y{1, 0, 1} is shorter than that between vectors R{R0, R1, R2} and Y{0, 0, 1} or if (iii) the distance between vectors R{R0, R1, R2} and Y{1, 1, 0} is shorter than that between vectors R{R0, R1, R2} and Y{0, 0, 0} or if (iv) the distance between vectors R{R0, R1, R2} and Y{1, 1, 1} is shorter than that between vectors R{R0, R1, R2} and Y{0, 0, 0}.

The conditions (i–iv) listed immediately above, are hereinbelow captured by and referred to, respectively, by Boolean variables A, B, C and D. For example, if condition (i) is satisfied, variable A is true and if condition (i) is not satisfied, variable A is false.

Figure 2A:
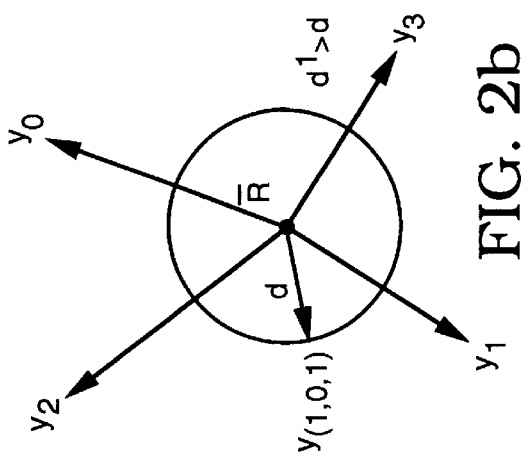
FIGS. 2A–2D show the Euclidean distances between the received signal vectors and the channel output signal vectors obtained using a look-ahead depth of 3.
Figure 2B:
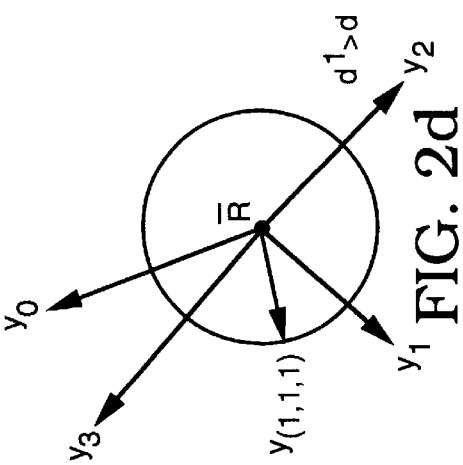
Figure 2C:
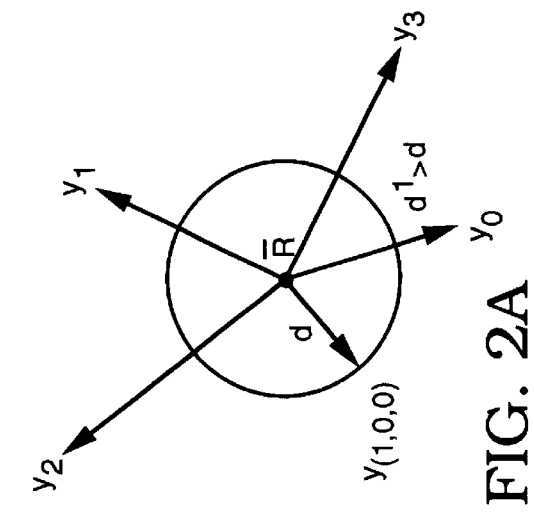
Figure 2D:
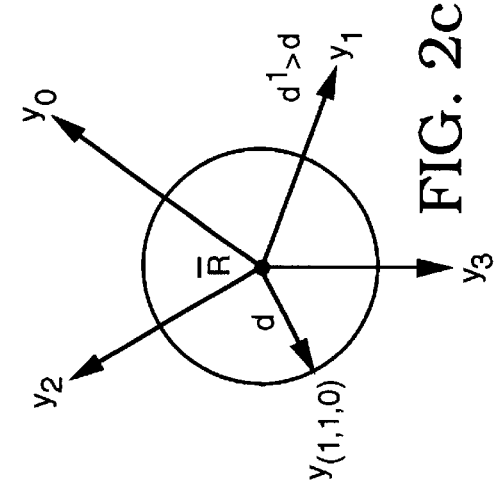

FIG. 2A shows the distance s between the vector R{R0, R1, R2} and each of the vectors Y{0, 0, 0}, Y{0, 0, 1}, Y{0, 1, 0}, Y{0, 1, 1}—respectively designated in FIG. 2A as $Y_0$, $Y_1$, $Y_2$, $Y_3$—and vector Y{1, 0, 0}. As seen from FIG. 2A, the distance between vectors R and Y{1, 0, 0} is shorter than all the other four distances shown. Accordingly, in FIG. 2A variable A is true. FIGS. 2B, 2C and 2D respectively illustrate the conditions required for Boolean variables B, C and D to be true.

As indicated earlier, variable A is true if the distance between vectors R{R0, R1, R2} and Y{1, 0, 0} is shorter than the distance between vectors R{R0, R1, R2} and Y{0, 0, 0}. From Table 1, it is seen that the distance between vectors R{R0, R1, R2} and Y{1, 0, 0} is:

$$[R0-(1+\alpha)]^2+(R1-\alpha)^2+R2^2$$

Similarly, the distance between vectors R{R0, R1, R2} and Y{0, 0, 0} is:

$$(R0-\alpha)^2+R1^2+R2^2$$

Accordingly, variable A is true, if:

$$[R0-(1+\alpha)]^2+(R1-\alpha)^2+R2^2<(R0-\alpha)^2+R1^2+R2^2$$

After regrouping and simplification, it is seen that variable A is true if the following inequality is true:

$$[R0+\alpha\times R1]>[(1+\alpha)^2]/2 \quad (2)$$

A similar derivation (not shown) indicates that variable B is true if:

$$[R0+\alpha\times R1]>[(1+\alpha)^2]/2 \quad (3)$$

variable C is true if:

$$[R0+(1+\alpha)\times R1+\alpha\times R2]>(1+\alpha)^2 \quad (4)$$

and variable D is true if:

$$[R0+(1+\alpha)\times(R1+R2)]>\frac{1}{2}+(3+\alpha)\times\alpha] \quad (5)$$

As seen above, Boolean variables A and B are equal. Consequently, assuming that at time k the encoder is in state +1, the decoder decodes a 1 if at least one of the Boolean variables A, B, C and D is true, otherwise the decoder decodes a 0.

Table 2, shown below, lists the encoder input bits A0–A2, the encoder output bits X0–X2, the channel output bits Y0–Y2 and the Nearest Neighbor distances when a depth parameter of 3 and an encoder state of $0^+$ are selected.

TABLE 2

| Encoder State = $0^+$ | | | |
|---|---|---|---|
| Encoder input signals A0, A1, A2 | Encoder output signals X0, X1, X2 | Channel output signals Y0, Y1, Y2 | Nearest Neighbor Distance |
| 0 0 0 | 0  0  0 | 0  0  0 | 0 |
| 0 0 1 | 0  0  −1 | 0  0  −1 | 1 |
| 0 1 0 | 0  −1  0 | 0  −1  −$\alpha$ | |

TABLE 2-continued

| Encoder State = $0^+$ | | | |
|---|---|---|---|
| Encoder input signals A0, A1, A2 | Encoder output signals X0, X1, X2 | Channel output signals Y0, Y1, Y2 | Nearest Neighbor Distance |
| 0 1 1 | 0  −1  −1 | 0  −1  −($\alpha$+1) | |
| 1 0 0 | −1  0  0 | −1, −$\alpha$  0 | $1+\alpha^2$ |
| 1 0 1 | −1  0  1 | −1, −$\alpha$  1 | $2+\alpha^2$ |
| 1 1 0 | −1  −1  0 | −1, −(1+$\alpha$), −$\alpha$ | $1+\alpha^2$ |
| 1 1 1 | −1  −1  −1 | −1, −(1+$\alpha$), −(1+$\alpha$) | $1+\alpha^2$ |

In accordance with Table 2, the Nearest Neighbor LA-MLSE algorithm decodes a 1 if any of the following four conditions (i–iv) are true, namely if:

(i) the distance between vectors R{R0, R1, R2} and Y{1, 0, 0} is shorter than that between vectors R{R0, R2, R3} and Y{0, 0, 0}—this condition is represented by Boolean variable E.

(ii) the distance between vectors R{R0, R1, R2} and Y{0, 0, 0} is shorter than that between vectors R{R0, R1, R2} and Y{0, 0, 1}—this condition is represented by Boolean variable F.

(iii) the distance between vectors R{R0, R1, R2} and Y{1, 1, 0} is shorter than that between vectors R{R0, R1, R2} and Y{0, 0, 0}—this condition is represented by Boolean variable G.

(iv) the distance between vectors R{R0, R1, R2} and Y{1, 1, 0} is shorter than that between vectors R{R0, R1, R2} and Y{0, 0, 0}—this condition is represented by Boolean variable H.

The algorithm employs the following equations to compute the Boolean variables E–H:
Variable d is true if:

$$[R0+\alpha\times R1]<-[(1+\alpha)^2]/2 \text{ if } 0<\alpha<1$$

or $$[R0+\alpha\times R1]<-(1+\alpha)^2/2$$

AND $$[R0-R1\times(1-\alpha)-R2\times\alpha]<0 \text{ if } \alpha=1$$

Variable F is true if:

$$[R0+\alpha\times R1-R2]<-[2+\alpha^2]/2$$

Variable G is true if $$[R0+\alpha\times R1]<-[(1+\alpha)^2]/2$$

Variable H is true if $$[R0+\alpha\times R1]<-[(1+\alpha)^2]/2$$

As seen above, Boolean variables G and H are equal. Accordingly, if the encoder is in state $0^+$, the algorithm decodes a 1 if at least one of the Boolean variables E, F, G or H, is true, otherwise the decoder decodes a 0.

Table 3, shown below, lists the encoder input bits A0–A2, the encoder output bits X0–X2 and the channel output bits Y0–Y2 when a depth parameter of 3 and an encoder state of −1 are selected.

TABLE 3

| Encoder State = 0⁻ | | | | | | | | |
|---|---|---|---|---|---|---|---|---|
| Encoder input signals A0, A1, A2 | | | Encoder output signals X0, X1, X2 | | | Channel output signals Y0, Y1, Y2 | | |
| 0 | 0 | 0 | 0 | 0 | 0 | $-\alpha$ | 0 | 0 |
| 0 | 0 | 1 | 0 | 0 | 1 | $-\alpha$ | 0 | 1 |
| 0 | 1 | 0 | 0 | 1 | 0 | $-\alpha$ | 1 | $\alpha$ |
| 0 | 1 | 1 | 0 | 1 | 1 | $-\alpha$ | 1 | $(1+\alpha)$ |
| 1 | 0 | 0 | −1 | 0 | 0 | $-(1+\alpha)$ | $-\alpha$ | 0 |
| 1 | 0 | 1 | −1 | 0 | 1 | $-(1+\alpha)$ | $-\alpha$ | 1 |
| 1 | 1 | 0 | −1 | −1 | 0 | $-(1+\alpha)$ | $-(1+\alpha)$ | $-\alpha$ |
| 1 | 1 | 1 | −1 | −1 | −1 | $-(1+\alpha)$ | $-(1+\alpha)$ | $-(1+\alpha)$ |

In accordance with Table 3, the algorithm decodes a 1 if at least one of the variables I, J, K and L, defined below, is true:

Boolean variable I is true if:

$$[R0+\alpha \times R1] < -[(1+\alpha)^2]/2$$

Boolean variable J is true if:

$$[R0+\alpha \times R1] < -[(1+\alpha)^2]/2$$

Boolean variable K is true if $$[R0+\alpha \times (1+R1)+\alpha \times R2] < -(1+\alpha)^2$$

Boolean variable L is true if $$[R0+(1+\alpha) \times (R1+R2)] < -[\tfrac{3}{2}+(3+\alpha) \times \alpha]$$

As seen above, Boolean variables I and J are equal.

Table 4, shown below, lists the encoder input bits A0–A2, the encoder output bits X0–X2 and the channel output bits Y0–Y2 when a depth parameter of 3 and an encoder state of 0⁻ are selected.

TABLE 4

| Encoder State = −1 | | | | | | | | |
|---|---|---|---|---|---|---|---|---|
| Encoder input signals A0, A1, A2 | | | Encoder output signals X0, X1, X2 | | | Channel output signals Y0, Y1, Y2 | | |
| 0 | 0 | 0 | 0 | 0 | 0 | 0 | 0 | 0 |
| 0 | 0 | 1 | 0 | 0 | 1 | 0 | 0 | 1 |
| 0 | 1 | 0 | 0 | 1 | 0 | 0 | 1 | $\alpha$ |
| 0 | 1 | 1 | 0 | 1 | 1 | 0 | 1 | $(1+\alpha)$ |
| 1 | 0 | 0 | 1 | 0 | 0 | 1 | $\alpha$ | 0 |
| 1 | 0 | 1 | 1 | 0 | −1 | 1, | $\alpha$, | −1 |
| 1 | 1 | 0 | 1 | 1 | 0 | 1, | $(1+\alpha)$, | $\alpha$ |
| 1 | 1 | 1 | 1 | 1 | 1 | 1, | $(1+\alpha)$, | $(1+\alpha)$ |

In accordance with Table 4, the algorithm decodes a 1 if at least one of the variables M, N, P and Q, defined below, is true:

Boolean variable M is true if:

$$[R0+\alpha \times R1] > [(1+\alpha)^2]/2 \text{ when } \alpha < 1$$

or $$[R0+\alpha \times R1] > (1+\alpha^2)/2$$

AND $$[R0-(1-\alpha) \times R1-R2\alpha] > 0 \text{ when } \alpha = 1$$

Boolean variable N is true if $$[R0+\alpha \times R1-R2] > (2+\alpha^2)/2$$

Boolean variable O is true if $$[R0+\alpha \times R1] > [(1+\alpha)^2]/2$$

Boolean variable P is true if $$[R0+\alpha \times R1] > [(1+\alpha)^2]/2$$

As seen above, Boolean variables O and P are equal.

Figure 3:
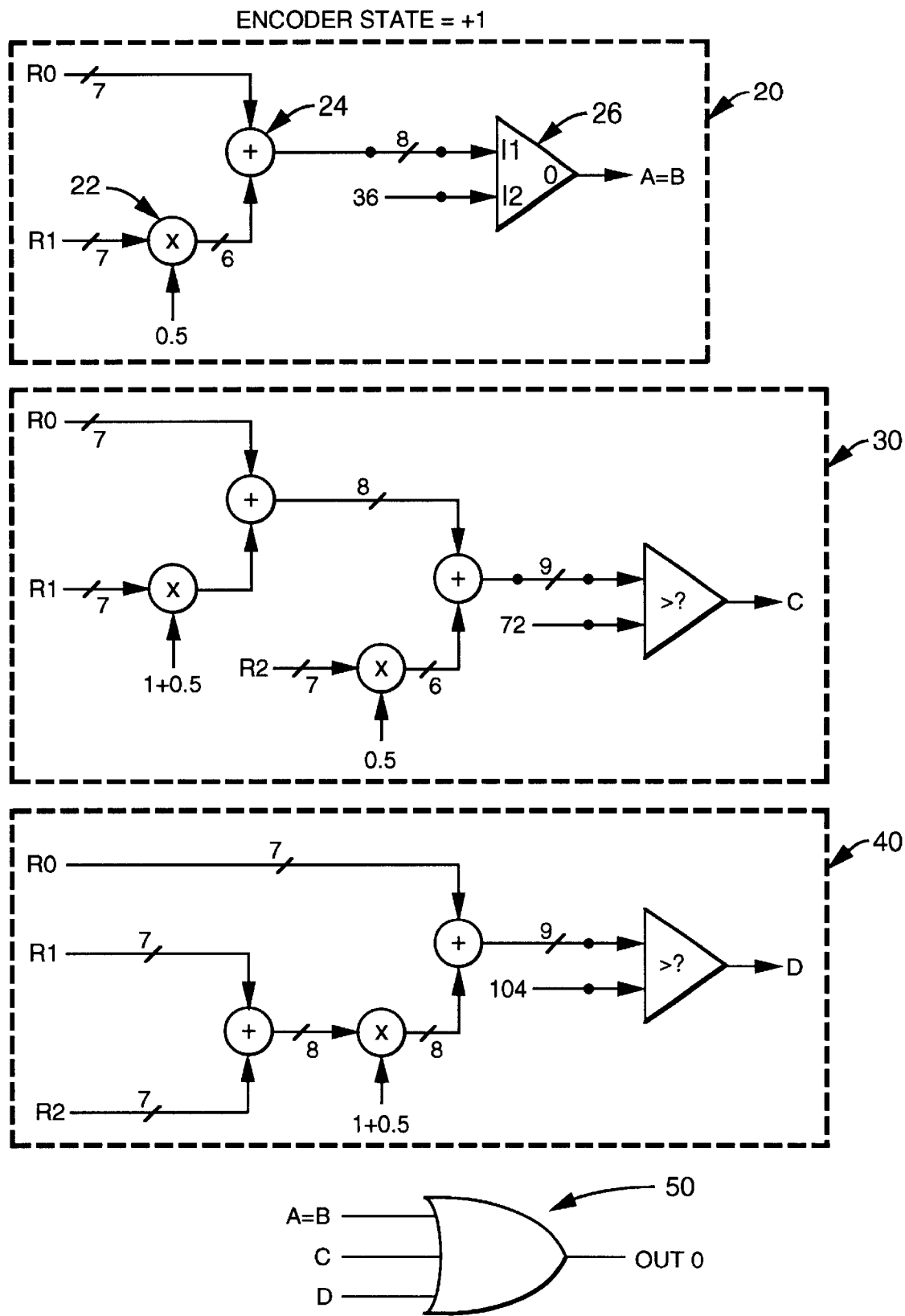
FIG. 3 shows the various logic blocks for implementing the Nearest Neighbor Look-Ahead Maximum Likelihood Estimation Sequence (MLSE), when the encoder is in state +1.
Figure 4:
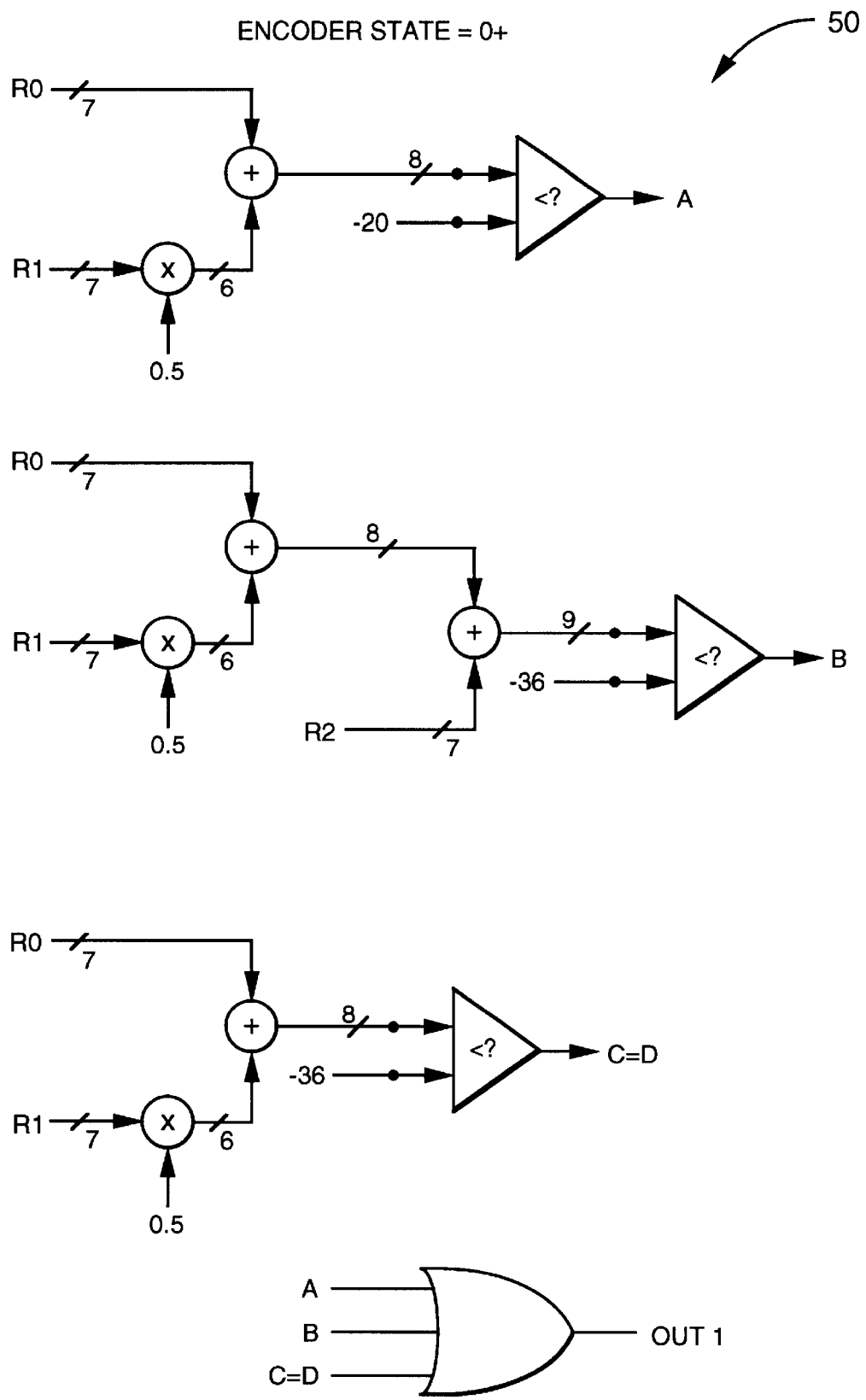
FIG. 4 shows the various logic blocks for implementing the Nearest Neighbor Look-Ahead MLSE algorithm, when the encoder is in state $0^+$.
Figure 5:
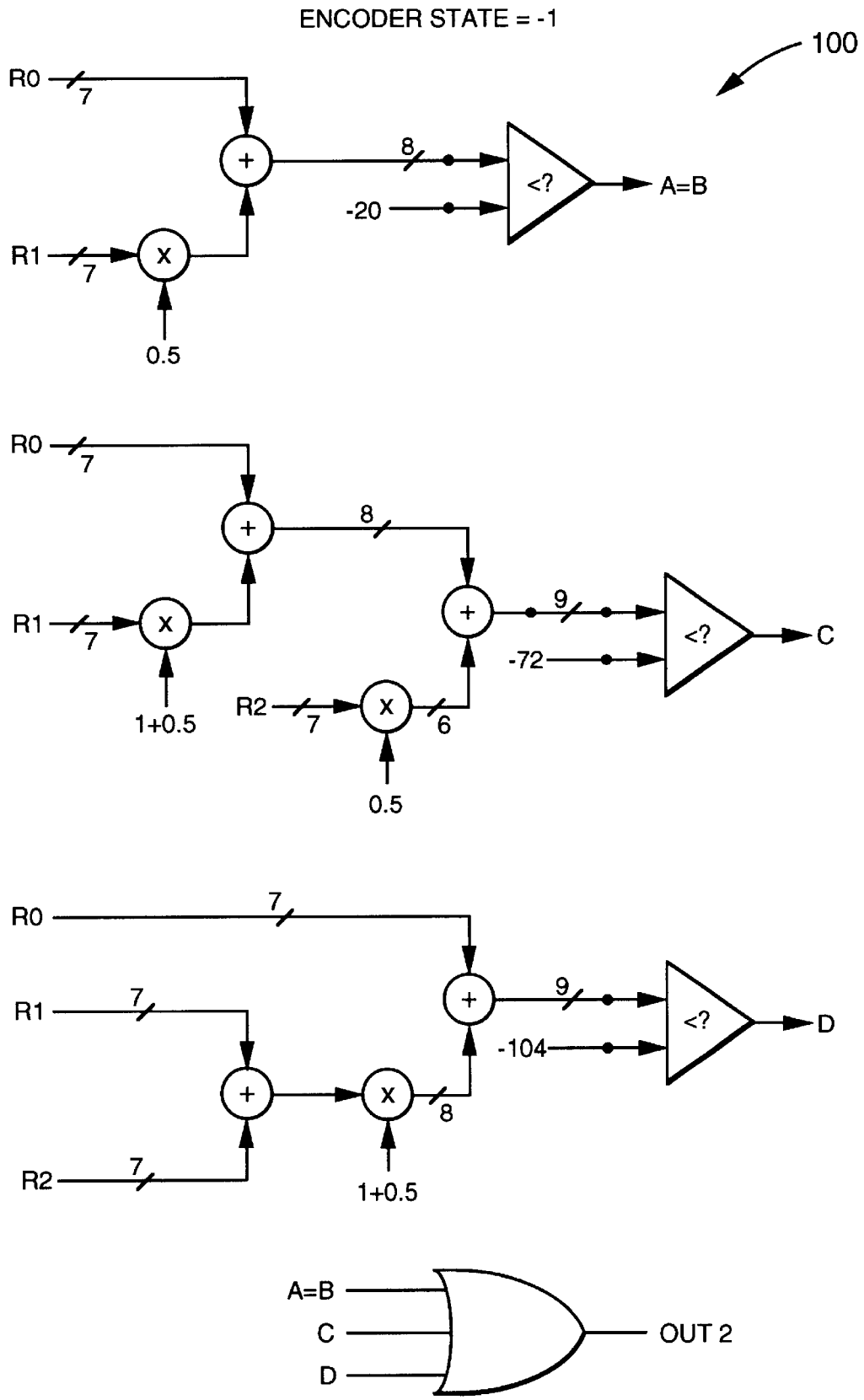
FIG. 5 shows the various logic blocks for implementing the Nearest Neighbor Look-Ahead MLSE algorithm, when the encoder is in state −1.
Figure 6:
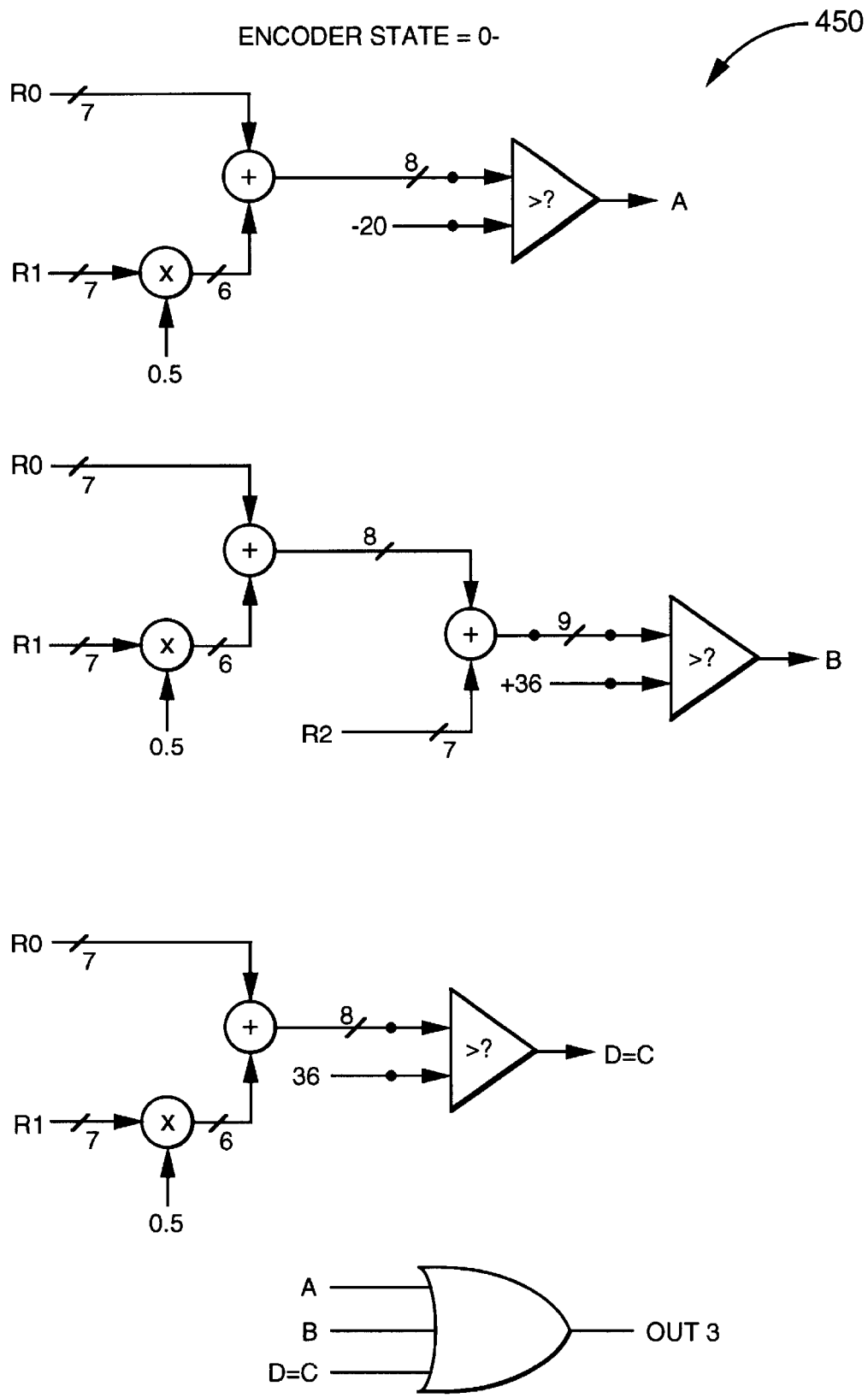
FIG. 6 shows the various logic blocks for implementing the Nearest Neighbor look-ahead MLSE algorithm, when the encoder is in state $0^-$.

FIGS. 3–6 illustrate various circuit logic blocks of a decoder, in accordance with one embodiment of the present invention, for evaluating variables A–D, E–H, I–L, M–P and thereby implementing the Nearest Neighbor LA-MLSE algorithm, described above. In order to simplify the task of dealing with fractional numbers, all decimal numbers are normalized to 32, therefore, e.g. number 1 is represented as 32, and number 1.5 is represented as 1.5×32=48. Moreover, it is assumed in FIGS. 3–6 that parameter α is equal to 0.5 and that each received signals R0, R1 and R2 is represented by a 7-bit signal. Because the principle of operation of the circuit logic blocks shown in FIGS. 3–6 is similar, only the operation of the logic blocks in FIG. 3 is described below.

In FIG. 3, logic 10 includes logic blocks 20, 30 and 40 and OR gate 50. Logic block 20 includes multiplier 22, adder 24 and comparator 26. Logic block 20 evaluates inequality (2), shown above, to determine the value of Boolean variables A and B, which as described above, are equal. Similarly, logic blocks 30 and 40 respectively evaluate inequalities (4) and (5) to determine Boolean variables C and D.

The left-hand side of inequality (2)—assuming α is equal to 0.5—is equal to (R0+0.5×R1). Multiplier 12 multiplies signal R1 by 0.5 and supplies the result to adder 24. Adder 24 adds the supplied result to R0 thereby to achieve (R0+ 0.5×R1) which is subsequently applied to input terminal I1 of comparator 26. The right-hand side of inequality (2), which is equal to 36 when normalized by 32, is applied to input terminal I2 of comparator 26. Comparator 26 generates a logic 1, if the signal applied to its input terminal I1 is greater than that applied to its input terminal I2. Consequently, if the value (R1+0.5×R2) is greater than 36, comparator 26 generates a logic 1 at its output terminal O, setting both Boolean variables A and B to true and thereby resulting in the decode of 1. If, on the other hand, the value (R1+0.5×R2) is smaller than 36, comparator 26 generates a logic 0 at its output terminal O, setting both Boolean variables A and B to false and thereby resulting in the decode of 0.

Logic blocks 30 and 40 respectively evaluate Boolean variables C and D in a similar manner and thus are not described. OR gate 50 receives signals from logic blocks 20, 30 and 40 and generates logic signal OUT0. Accordingly, when logic signal OUT0 is 1, the decoder decodes a 1, otherwise the decoder decodes a 0.

Figure 7:
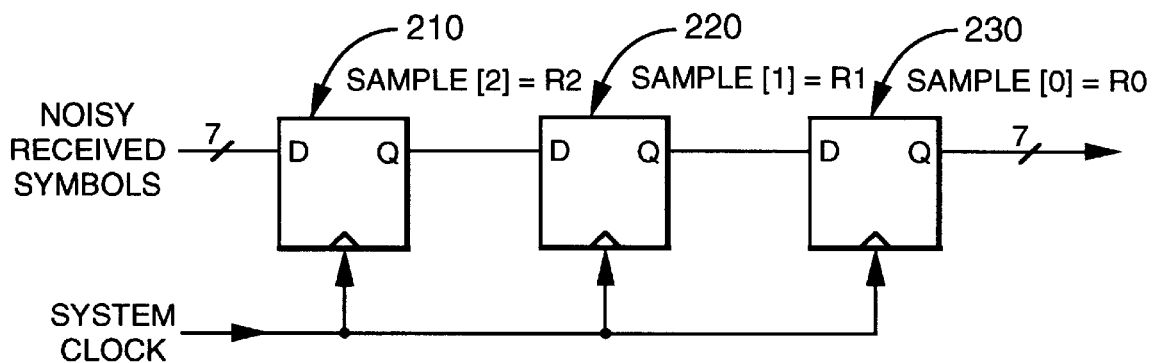
FIG. 7 shows a three-bit shift register for receiving and storing the signals received at times k, k+1 and k+2.

FIG. 7 shows a three-bit shift register 200 for receiving and storing three samples (i.e. R0, R1 and R2,) of one bit of the 7-bit signal R. Six more three-bit shift-registers similar to shift register 200 each receive and store three samples of the other six bits of signal R (not shown).

With each clock cycle the data stored at the Q terminal of register 210 of shift register 200 is transferred to the D terminal of register 220 and, similarly, the data stored in the Q terminal of register 220 is transferred to the D terminal of register 230. Consequently, the Q terminal of registers 210, 220 and 230 respectively contain one bit of the signals R0, R1 and R2 for decoding the data, in accordance with the above equations.

Figure 8:
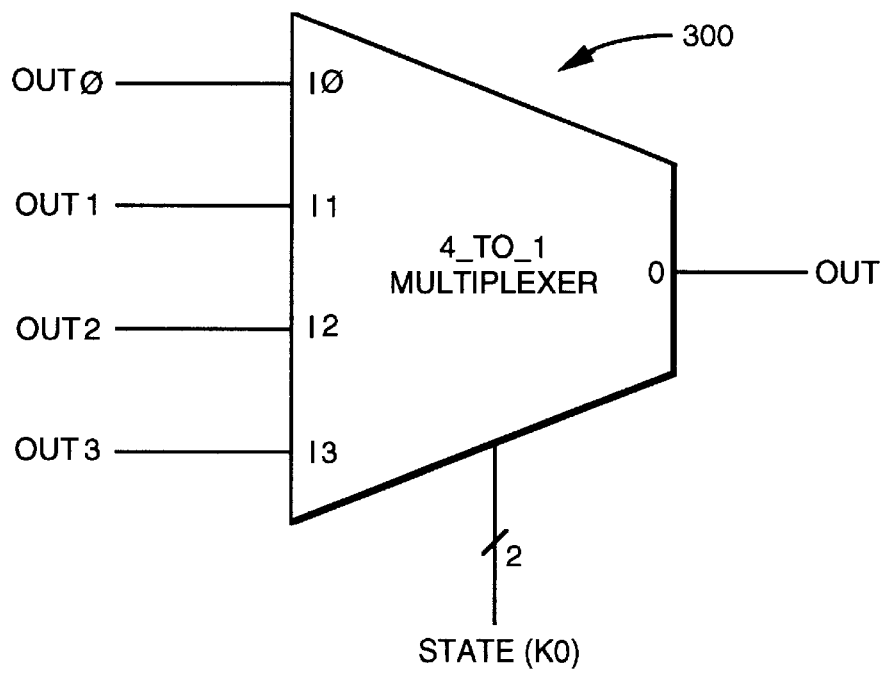
FIG. 8 shows a 4-to-1 multiplexer for selecting one of four input signals in response to the state of the Trellis encoder.

FIG. 8, shows a 4-to-1 multiplexer 300 for selecting one of the input signals, OUT0, OUT1, OUT2 and OUT3—which are respectively generated in logic blocks, 10, 55, 100 and 150—and for supplying the selected signal to output terminal O. When the encoder is in state +1, signal OUT0 is supplied to the output terminal O of multiplexer 300; when the encoder is in state $0^+$, signal OUT1 is supplied to the output terminal O of multiplexer 300; when the encoder is in state −1, signal OUT2 is supplied to the output terminal O; and when the encoder is in state $0^-$, signal OUT0 is supplied to the output terminal O of multiplexer 300. As noted earlier, the encoder state is determined using the well-known techniques described above.

As seen from FIGS. 3–6, no feedback loop is used in logic blocks 10, 55, 100 and 150 for evaluating Boolean variables A–P. Therefore, the Nearest Neighbor LA-MLSE decoder may be fully pipelined to simultaneously increase its throughput and reduce the amount of circuitry needed to implement the algorithm. In other words, for the same throughput, the circuitry required to implement the LA-MLSE algorithm is advantageously smaller and simpler than that required to implement the Viterbi algorithm.

Furthermore, the Nearest Neighbor LA-MLSE decoder requires a relatively small amount of memory space and has a reduced latency. Moreover, the decoder lends itself to the design methodologies which take advantage of the commercially available hardware behavioral modeling languages such as Verilog and VHDL and design synthesis tools.

In accordance with another embodiment of the present invention, an All Neighbors LA-MLSE algorithm decodes the encoded data. With the exception of the columns entitled Nearest Neighbor Distance, the remaining columns of Tables 1–4, shown above, apply to the All Neighbors LA-MLSE algorithm, and are, thus, pertinent to the discussion below.

Assuming that the depth parameter is 3, and that the encoder is in state +1 at time k, the algorithm decodes a 1, if any of the following 4 conditions—namely a, b, c and d—is true:

a) the distance between the received signal vector R{R0, R1, R2} and the channel output vector Y{1, 0, 0} is shorter than that between vector R{R0, R1, R2} and each of the channel output vectors which is of the form Y{0, Y1, Y2};

b) the distance between vector R{R0, R1, R2} and the channel output vector Y{1, 0, 1} is shorter than that between vector R{R0, R1, R2} and each of the channel output vectors which is of the form Y{0, Y1, Y2};

c) the distance between vector R{R0, R1, R2} and the channel output vector Y{1, 1, 0} is shorter than that between vector R{R0, R1, R2} and each of the channel output vectors which is of the form Y{0, Y1, Y2};

d) the distance between vector R{R0, R1, R2} and the channel output vector Y{1, 1, 1} is shorter than that between vector R{R0, R1, R2} and each of the channel output vectors which is of the form Y{0, Y1, Y2}.

Assume that the logical conditions a–d are respectively captured by and referred to by Boolean variables AA, AB, AC and AD. Accordingly if e.g. condition a is satisfied, variable AA is true, and if condition a is not satisfied, variable AA is false. Consequently, if at least one of the variables AA, AB, AC or AD is true, the algorithm decodes a 1, otherwise it decodes a 0.

To further simplify and minimize the number of computations, the All Neighbors LA-MLSE algorithm employs the following equations to compute the values of the Variables AA, AB, AC and AD.

Variable AA is true if all of the following inequalities (i–iv) are true:

$[R0+\alpha R1] > (1+\alpha^2)/2$     i)

$[R0+\alpha \times R1+R2] > [(1+\alpha^2)/2]$     ii)

$[R0+(1+\alpha) \times R1+\alpha \times R2] > \alpha$     iii)

$[R0+(R1+R2) \times (1+\alpha)] > -\frac{1}{2}$     iv)

Variable AB is true if all of the following inequalities (i–iv) are true:

$[R0+\alpha \times R1-R2] > [((1+\alpha^2)/2)+\frac{1}{2}]$     i)

$[R0+\alpha \times R1] > [(1+\alpha^2)/2]$     ii)

$[R0+(1+\alpha) \times R1-(1-\alpha) \times R2] < [(1+2\alpha)/2]$     iii)

$[R0+(1+\alpha) \times R1+\alpha \times R2] < 0$     iv)

Variable AC is true if all of the following inequalities (i–iv) are true:

$[R0+(1+\alpha) \times R1+\alpha \times R2] > [(1+\alpha)^2]$     i)

$[R0+(1+\alpha) \times (R1+R2)] > [\frac{1}{2}+\alpha^2+2 \times \alpha]$     ii)

$[R0+(2+\alpha) \times R1+2 \times \alpha \times R2] \times 2 > 1+\alpha^2+4 \times \alpha$     iii)

$[R0+(2+\alpha) \times R1+(1+2 \times \alpha) \times R2] \times 2 > \alpha^2+2 \times \alpha$     iv)

Variable AD is true if all of the following inequalities (i–iv) are true:

$[2 \times R0+2 \times (1+\alpha) \times (R1+R2)] < [3 \times (1+\alpha^2)-\alpha^2]$     i)

$[2 \times R0+2 \times (1+\alpha) \times (R1+R2)+2 \times (2+\alpha) \times R2] > [3 \times (1+\alpha^2)-1+\alpha^2]$     ii)

$[2 \times R0+2 \times (1+\alpha) \times R1+2 \times (2+\alpha) \times R2] > [\alpha^2/2+3 \times \alpha+1]$     iii)

$[R0+(2+\alpha) \times R1+2 \times (2+\alpha) \times R2] > [\alpha^2+5]/2$     iv)

If at time k the encoder is in state $0^+$, assuming that the depth parameter is equal to 3, the algorithm decodes a 1 if at least one of the Boolean variables AE, AR, AG or AH, defined below, is true.

Variable AE is true if all of the following inequalities (i–iv) are true:

$[R0+\alpha R1] < -[(1+\alpha^2)/2]$     i)

$[R0+\alpha \times R1-R2] < -\alpha^2/2$     ii)

$[R0+(1-\alpha) \times R1+\alpha \times R2] < 0$     iii)

$[R0-(1-\alpha) \times R1-(1+\alpha) \times R2] < [1+2 \times \alpha]/2$     iv)

Variable AF is true if all of the following inequalities (i–iv) are true:

$[R0+\alpha \times R1-R2] > (2+\alpha^2)/2+\frac{1}{2}$     i)

$[R0+\alpha \times R1-2 \times R2] > -[(1+\alpha^2)/2]$     ii)

$[R0-(1-\alpha) \times R1-(1+\alpha) \times R2] < -\frac{1}{2}$     iii)

$[R0-(1-\alpha) \times R1-(2+\alpha) \times R2] < \alpha$     iv)

Variable AG is true if all of the following inequalities (i–iv) are true:

$[R0+(1+\alpha) \times R1+\alpha \times R2] > [1+\alpha^2+(1+\alpha)^2]$    i)

$[R0+(1+\alpha) \times R1-(1-\alpha) \times R2] < [\alpha^2+(1+\alpha)^2]/2$    ii)

$[R0+\alpha \times R1] < -(1+\alpha)^2/2$    iii)

$[R0+\alpha \times R1-R2)] < -\alpha^2/2$    iv)

Variable AH is true if all of the following inequalities (i–iv) are true:

$[R0+(1+\alpha) \times (R1+R2)] < [-\frac{1}{2}-(1+\alpha^2)]$    i)

$[R0+(1+\alpha) \times (R1+R2)] < -(1+\alpha^2)$    ii)

$[R0+\alpha \times R1+R2] < -(1+\alpha)^2+\alpha^2/2$    iii)

$[R0+\alpha \times R1] < -(1+\alpha)^2$    iv)

Accordingly, if none of the variables AE, AF, AG and AH, defined immediately above, is true, the algorithm decodes a 0.

If at time k the encoder is in state −1, assuming that the depth parameter is 3, the algorithm decodes a 1 if at least one of the Boolean variables AI, AJ, AK or AL, defined below, is true.

Variable AI is true if all of the following inequalities (i–iv) are true:

$[R0+\alpha R1] < -[(1+\alpha^2)/2]$    i)

$[R0+\alpha \times R1+R2] < -[(1+\alpha^2)/2]$    ii)

$[R0+(1+\alpha) \times R1+\alpha \times R2)] < -\alpha$    iii)

$[R0+(R1+R2) \times (1+\alpha)] < +\frac{1}{2}$    iv)

Variable AJ is true if all of the following inequalities (i–iv) are true:

$[R0+\alpha \times R1-R2] < -[((1+\alpha^2)/2)+\frac{1}{2}]$    i)

$[R0+\alpha \times R1] < -[(1+\alpha^2)/2]$    ii)

$[R0+(1+\alpha) \times R1-(1-\alpha) \times R2)] > -[(1+2 \times \alpha)/2]$    iii)

$[R0+(1+\alpha) \times R1+\alpha \times R2)] > 0$    iv)

Variable AK is true if all of the following inequalities (i–iv) are true:

$[R0+(1+\alpha) \times R1+\alpha \times R2] < -[(1+\alpha)^2]$    i)

$[R0+(1+\alpha) \times (R1+R2)] < -[\frac{1}{2}+\alpha^2+2 \times \alpha]$    ii)

$[R0+(2+\alpha) \times R1+2 \times \alpha \times R2] \times 2 < -[1+\alpha^2+4 \times \alpha]$    iii)

$[R0+(2+\alpha) \times R1+(1+2 \times \alpha) \times R2] \times 2 < -[\alpha^2+2 \times \alpha]$    iv)

Variable AL is true if all of the following inequalities (i–iv) are true:

$[2 \times R0+2 \times (1+\alpha) \times (R1+R2)] > -[3 \times (1+\alpha^2)-\alpha^2]$    i)

$[2 \times R0+2 \times (1+\alpha) \times (R1+R2)+2 \times (2+\alpha) \times R2] < -[3 \times (1+\alpha^2)-1+\alpha^2]$    ii)

$[2 \times R0+2 \times (1+\alpha) \times R1+2 \times (2+\alpha) \times R2] < -[\alpha^2/2+3 \times \alpha+1]$    iii)

$[R0+(2+\alpha) \times R1+2 \times (2+\alpha) \times R2] < -[\alpha^2+5]/2$    iv)

Accordingly, if none of the variables AI, AJ, AK and AL, defined immediately above is true, the algorithm decodes a 0.

If at time k the encoder is in state $0^-$, assuming the depth parameter is 3, the algorithm decodes a 1 if at least one of the Boolean variables AM, AN, AO or AP, defined below, is true.

Variable AM is true if all of the following inequalities i–iv are true:

$[R0+\alpha R1] > [(1+\alpha^2)/2]$    i)

$[R0+\alpha \times R1-R2] > \alpha^2/2$    ii)

$[R0+(1-\alpha) \times R1+\alpha \times R2)] > 0$    iii)

$[R0-(1-\alpha) \times R1-(1+\alpha) \times R2] > -[1+2 \times \alpha]/2$    iv)

Variable AN is true if all of the following inequalities i–iv are true:

$[R0+\alpha \times R1-R2] < -[(2+\alpha^2)/2+\frac{1}{2}]$    i)

$[R0+\alpha \times R1-2 \times R2] < [(1+\alpha^2)/2]$    ii)

$[R0-(1-\alpha) \times R1-(1+\alpha) \times R2)] > \frac{1}{2}$    iii)

$[R0-(1-\alpha) \times R1-(2+\alpha) \times R2)] > -\alpha$    iv

Variable AO is true if all of the following inequalities i–iv are true:

$[R0+(1+\alpha) \times R1+\alpha \times R2] < -[1+\alpha^2+(1+\alpha)^2]$    i)

$[R0+(1+\alpha) \times R1-(1-\alpha) \times R2] > -[\alpha^2+(1+\alpha)^2]/2$    ii)

$[R0+\alpha \times R1] > (1+\alpha)^2/2$    iii)

$[R0+\alpha \times R1-R2)] > \alpha^2/2$    iv)

Variable AP is true if all of the following inequalities i–iv are true:

$[R0+(1+\alpha) \times (R1+R2)] < [-\frac{1}{2}-(1+\alpha^2)]$    i)

$[R0+(1+\alpha) \times (R1+R2)] < -(1+\alpha^2)$    ii)

$[R0+\alpha \times R1+R2] < -[(1+\alpha)^2+\alpha^2/2]$    iii)

$[R0+\alpha \times R1] < -(1+\alpha)^2$    iv)

Accordingly, if none of the variables AM, AN, AO and AP, defined immediately above, is true, the algorithm decodes a 0.

In some embodiments of the present invention, the depth parameter of the Nearest Neighbor LA-MLSE decoder is varied so as to minimize the amount of computation needed to decode the data, hence the name Nearest Neighbor Adjusted-Depth LA-MLSE, which is described below.

When the encoder is in state +1, as shown above, the distance between the channel output vector $Y\{1, 0, 0\}$ and its closest (the Nearest Neighbor) vector $Y\{0, 0, 0\}$ is $(1+\alpha^2)$. Accordingly, the distance between vector $R\{R0, R1, R2\}$ and vector $Y\{1, 0, 0\}$ is smaller than that between vector $R\{R0, R1, R2\}$ and vector $Y\{0, 0, 0\}$ if the Boolean variable A, defined above and listed below for convenience is true:

A:

$[R0+\alpha \times R1] > [(1+\alpha)^2]/2$

Similarly, the distance between the channel output vector $Y\{1, 0, 1\}$ and its closest vector $Y\{0, 0, 1\}$ is $(1+\alpha^2)$. Accordingly, the distance between vector $R\{R0, R1, R2\}$ and vector $Y\{1, 0, 1\}$ is smaller than that between vector $R\{R0, R1, R2\}$ and vector $Y\{0, 0, 1\}$ if Boolean variable A is true.

The distance between the channel output vector $Y\{1, 1, 0\}$ and its closest vector $Y\{0, 0, 0\}$ is, however, equal to $1+(1+\alpha)^2+\alpha^2$, which distance is greater than $(1+\alpha^2)$ for all values of $\alpha$ in the range of 0 to 1. Therefore, when the channel output vector is $Y\{1, 1, 0\}$, only the first two signals of the vector R (i.e. R0 and R1) are required in calculating the Euclidean distance, and, as such, an LA-MLSE depth of 2 is used. Consequently, the distance between vector $R(R0\ R1)$ and vector $Y\{1, 1\}$ is smaller than that between vector $R\{R0, R1\}$ and vector $Y\{0, 0\}$ if Boolean variable Q, defined by the following inequality is true:

Q:

$$[R0+(1+\alpha)\times R1] > (1+\alpha)^2 - \alpha^2/2$$

Similarly, the distance between the channel output vector $Y\{1, 1, 1\}$ and its closest vector $Y\{0, 0, 0\}$ is equal to $1+2\times(1+\alpha)^2$, which distance is greater than $(1+\alpha^2)$ for all values of $\alpha$ in the range of 0 to 1. Therefore, when the channel output vector is $Y\{1, 1, 1\}$, only the first two signals of vector R (i.e. R0 and R1) are required in calculating the Euclidean distance, and, as such, an MLSE depth of 2 is used. Hence, the distance between vector $R\{R0, R1\}$ and vector $Y\{1, 1\}$ is smaller than that between vector $R\{R0, R1\}$ and vector $Y\{0, 0\}$ if Boolean variable Q, defined above, is true.

Consequently, when the encoder is in state +1, in accordance with the Nearest Neighbor Adjusted-Depth LA-MLSE algorithm, a 1 is decoded if either of the variables A or Q is true, otherwise, a 0 is decoded.

When the encoder is in state $0^+$, the distances between vector $Y\{1, 0, 0\}$ and vectors $Y\{0, 0, 0\}$ and $Y\{0, 1, 0\}$ are respectively equal to $(1+\alpha^2)$ and $(1+(1-\alpha)^2+\alpha^2)$, which distances are equal when $\alpha$ is equal to 1. Accordingly, when the channel output vector is $Y\{1, 0, 0\}$, Boolean variable R, defined below, is true if both of the following inequalities (i–ii) are true:

R:

$$[R0+\alpha\times R1] < -(1+\alpha^2)/2 \quad \text{i)}$$

AND $$[R0+(\alpha-1)\times R1 - \alpha\times R2 < 0 \quad \text{ii)}$$

The distance between the channel output vector $Y\{1, 0, 1\}$ and its closest vector $Y\{0, 0, 0\}$ is equal to $(1+\alpha)^2$. Accordingly, the distance between vector $R\{R0, R1, R2\}$ and vector $Y\{1, 0, 1\}$ is smaleler than that between vector $R\{R0, R1, R2\}$ and vector $Y\{0, 0, 0\}$ if the Boolean variable S, defined below, is true:

S:

$$[R0+\alpha\times R1-R2] < -(2+\alpha^2)/2$$

The distance between the channel output vector $Y\{1, 1, 0\}$ and its closest vector $Y\{0, 1, 0\}$ is equal to $(1+\alpha)^2$. Accordingly, the distance between vector $R\{R0, R1, R2\}$ and vector $Y\{1, 1, 0\}$ is smaller than that between vector $R\{R0, R1, R2\}$ and vector $Y\{0, 1, 0\}$ if the Boolean variable T, defined below, is true:

T:

$$[R0+\alpha\times R1] < -(1+\alpha)^2/2$$

The distance between the channel output vector $Y\{1, 1, 1\}$ and its closest vector $Y\{0, 1, 1\}$ is equal to $(1+\alpha)^2$. Accordingly, the distance between vector $R\{R0, R1, R2\}$ and vector $Y\{1, 1, 1\}$ is smaller than that between vector $R\{R0, R1, R2\}$ and vector $Y\{0, 1, 1\}$ if the Boolean variable T, defined above, is true.

Consequently, when the encoder is in state $0^+$, in accordance with the Nearest Neighbor Adjusted-Depth LA-MLSE algorithm, a 1 is decoded if at least one of the variables R, S and T is true, otherwise, a 0 is decoded.

If the encoder is in state −1 during time k, in accordance with the Nearest Neighbor Adjusted Depth LA-MLSE algorithm, a 1 is decoded if at least one of the following Boolean variables U and V is true:

U:

$$R0+\alpha\times R1 < -(1+\alpha^2)/2$$

V:

$$R0+(1+\alpha)\times R1 < -[(1+\alpha)^2-\alpha^2/2]2$$

If the encoder is in state 0 during time k, in accordance with the Nearest Neighbor Adjusted Depth LA-MLSE algorithm, a 1 is decoded if both variables W and X, defined below, are true, or if either of the variable Y or Z, (defined below) are true:

W:

$$R0+\alpha\times R1 > (1+\alpha^2)/2$$

X:

$$R0+(\alpha-1)\times R1-\alpha\times R2 > 0$$

Y:

$$R0+\alpha\times R1-R2 > (2+\alpha^2)$$

Z:

$$R0+\alpha\times R1 > (1+\alpha)^2/2$$

The exemplary embodiments of the invention disclosed above are illustrative and not limitative. It is obvious to those skilled in the art that a depth parameter other than the ones disclosed above may be used. The invention is not limited to the particular z-transform of the transmission channel assumed above. The invention is not limited to the particular noise distribution of the channel; nor is it limited to the particular channel parameters disclosed herein.

Other embodiments of this inventions are obvious to those skilled in the art and are intended to fall within the scope of the appended claims.

We claim:

1. In a communication system having a channel for transmitting and receiving signals, a method for decoding data at a kth time step, said method comprising the acts of:

forming a vector R having n signals and including a signal received at the receiving end at the kth time step, where n is an integer;

forming vectors Y of noise-free channel output signals, each said vector Y having n signals;

finding a distance between vector R and each of a subset of the vectors Y; and decoding a 1 if the distance between vector R and at least one vector in said subset is shorter than the distance between vector R and a nearest neighbor vector of the vector in said subset, wherein said nearest neighbor vector is selected from among vectors Y which are not part of the subset.

2. The method of claim 1 wherein a first signal of said vector R is said signal received at the kth time step.

3. The method of claim 2 wherein said R vector further comprises n−1 signals which are received after the kth time step.

4. The method of claim 3 wherein each of said Y vectors is a noise-free channel response to a different one of a permutation of n input bits, wherein n is the number of said signals in said R vector.

5. The method of claim 4 wherein said subset of vectors comprises all the Y vectors whose first signal is the channel response to a binary 1.

6. The method of claim 5 wherein said n is 3.

7. The method of claim 6 wherein the nearest neighbor vector to another vector is that which has the shortest of all the distances to the other vector, wherein the distance between each two vectors is defined as the sum of the square of the differences between the corresponding signals of the two vectors for each of the time steps k, k+1 and k+2.

8. The method of claim 7 wherein said communication channel has a z-transform of $1+\alpha \times z^{-1}$, wherein $\alpha$ is a number greater than zero and less than or equal to 1.

9. The method of claim 8 wherein said method decodes a 1 if at the kth time step an encoder of the communication system is in state +1 and if at least one of the following three inequalities (i–iii) is true:

$(R0+\alpha \times R1) > ((1+\alpha^2))/2$ (i)

$(R0+(1+\alpha) \times R1 + \alpha \times R2) > (1+\alpha)^2$ (ii)

$(R0+(1+\alpha) \times (R1+R2)) > (3/2+(3+\alpha) \times \alpha)$ (iii)

wherein R0, R1 and R2 respectively represent signals received at time steps k, k+1 and k+2.

10. The method of claim 9 wherein said method decodes a 1 if at the kth time step the encoder is in state $0^+$ and if at least one of the following three inequalities (i–iii) is true:

$(R0+\alpha \times R1) < -((1+\alpha)^2)/2$ if $0 < \alpha < 1$ or $(R0+\alpha \times R1) < -(1+\alpha^2)/2$ AND $(R0-R1 \times (1-\alpha) - R2 \times \alpha) < 0$ if $\alpha=1$ (i)

$(R0+\alpha \times R1 - R2) < -(2+\alpha^2)/2$ (ii)

$(R0+\alpha \times R1) < -((1+\alpha)^2)/2$ (iii).

11. The method of claim 10 wherein said method decodes a 1 if at the kth time step the encoder is in state −1 and if at least one of the following three inequalities (i–iii) is true:

$(R0+\alpha \times R1) < -((1+\alpha)^2)/2$ (i)

$(R0+\alpha \times (1+R1) + \alpha \times R2) < -(1+\alpha)^2$ (ii)

$(R0+(1+\alpha) \times (R1+R2)) < -(3/2+(3+\alpha) \times \alpha)$ (iii)

12. The method of claim 11 wherein said method decodes a 1 if at the kth time step the encoder is in state $0^-$ and if at least one of the following three inequalities (i–iii) is true:

$(R0+\alpha \times R1) > ((1+\alpha)^2)/2$ if $\alpha < 1$ or $(R0+\alpha \times R1) > (1+\alpha^2)/2$ AND $(R0-(1-\alpha) \times R1 - R2 \times \alpha) > 0$ if $\alpha=1$ (i)

$(R0+\alpha \times R1 - R2) > (2+\alpha^2)/2$ (ii)

$(R0+\alpha \times R1) > ((1+\alpha)^2)/2]$ (iii).

13. The method of claim 12 wherein said decoding is done using a decoder which comprises a plurality of multipliers, adders and comparators, wherein said decoder does not include any feed-back loops.

14. The method of claim 12 wherein said decoding is done using a decoder which comprises a plurality of multipliers, adders and comparators, wherein said decoder does not include any feed-back loops.

15. In a communication system having a channel for transmitting and receiving signals, a method for decoding data at a kth time step, said method comprising the acts of:

forming a vector R having n signals and including a signal received at the receiving end at the kth time step, where n is an integer;

forming vectors Y of noise-free channel output signals, each said vector Y having n signals;

finding a distance between vector R and each of a subset of the vectors Y; and decoding a 1 if the distance between vector R and at least one of the vectors in said subset is shorter than the distance between vector R and all other vectors which are not part of the subset.

16. The method of claim 15 wherein a first signal of vector R is said signal received at the kth time step.

17. The method of claim 16 wherein said R vector further comprises signals which are received after the kth time step.

18. The method of claim 17 wherein each of said Y vectors is a noise-free channel response to a different one of a permutation of n input bits, wherein n is the number of signals in said R vector.

19. The method of claim 18 wherein said subset of vectors comprises all the Y vectors whose first signal is the channel response to a binary 1.

20. The method of claim 19 wherein said n is 3.

21. The method of claim 20 wherein the distance between each two vectors is defined as the sum of the square of the differences between the corresponding signals of the two vectors for each of the times k, k+1 and k+2.

22. The method of claim 21 wherein said communication channel has a z-transform of $1+\alpha \times z^{-1}$, wherein $\alpha$ is a number greater than zero and less than or equal to 1.

23. The method of claim 22 wherein said method decodes a 1 if at the kth time step an encoder of the communication system is in state +1 and if all the four inequalities (i–iv) in at least one of the below defined groups a and b and c and d, are true:

group (a)

$(R0+\alpha R1) > (1+\alpha^2)/2$ (i)

$(R0+\alpha \times R1 + R2) > ((1+\alpha^2)/2)$ (ii)

$(R0+(1+\alpha) \times R1 + \alpha \times R2)) > \alpha$ (iii)

$(R0+(R1+R2) \times (1+\alpha)) > -\frac{1}{2}$ (iv)

group (b)

$(R0+\alpha \times R1 - R2) > (((1+\alpha^2)/2) + \frac{1}{2})$ (i)

$(R0+\alpha \times R1) > ((1+\alpha^2)/2)$ (ii)

$(R0+(1+\alpha) \times R1 - (1-\alpha) \times R2)) < ((1+2 \times \alpha)/2)$ (iii)

$(R0+(1+\alpha) \times R1 + \alpha \times R2)) < 0$ (iv)

group (c)

$(R0+(1+\alpha) \times R1 + \alpha \times R2) > ((1+\alpha)^2)$ (i)

$(R0+(1+\alpha) \times (R1+R2)) > (1/2+\alpha^2+2 \times \alpha)$ (ii)

$(R0+(2+\alpha)\times R1+2\alpha\times R2)\times 2 > 1+\alpha^2+4\times\alpha$ (iii)

$(R0+(2+\alpha)\times R1+(1+2\times\alpha)\times R2)\times 2 > \alpha^2 2\times\alpha$ (iv)

group (d)

$(2\times R0+2\times(1+\alpha)\times(R1+R2))<(3\times(1+\alpha^2)-\alpha^2)$ (i)

$(2\times R0+2\times(1+\alpha)\times(R1+R2)+2\times(2+\alpha)\times R2)>(3\times(1+\alpha^2)-1+\alpha^2)$ (ii)

$(2\times R0+2\times(1+\alpha)\times R1+2\times(2+\alpha)\times R2)>(\alpha^2/2+3\times\alpha+1)$ (iii)

$(R0+(2+\alpha)\times R1+2\times(2+\alpha)\times R2)>(\alpha^2+5)/2$ (iv)

and wherein R0, R1 and R2 respectively represent signals received at time steps k, k+1 and k+2.

24. The method of claim 23 wherein said method decodes a 1 if at the kth time step the encoder is in state $0^+$ and if all the four inequalities (i–iv) in at least one of the below defined groups e and f and g and h, are true:

group (e)

$(R0+\alpha R1)<-((1+\alpha^2)/2)$ (i)

$(R0+\alpha\times R1-R2)<-\alpha^2/2$ (ii)

$(R0+(1-\alpha)\times R1+\alpha\times R2))<0$ (iii)

$(R0-(1-\alpha)\times R1-(1+\alpha)\times R2)<(1+2\times\alpha)/2$ (iv)

group (f)

$(R0+\alpha\times R1-R2)>(2+\alpha^2)/2+\frac{1}{2}$ (i)

$(R0+\alpha\times R1-2\times R2)>-((1+\alpha^2)/2)$ (i)

$(R0-(1-\alpha)\times R1-(1+\alpha)\times R2))<-1/2$ (iii)

$(R0-(1-\alpha)\times R1-(2+\alpha)\times R2))<\alpha$ (iv)

group (g)

$(R0+(1+\alpha)\times R1+\alpha\times R2)>(1+\alpha^2+(1+\alpha)^2)$ (i)

$(R0+(1+\alpha)\times R1-(1-\alpha)\times R2)<(\alpha^2+(1+\alpha)^2)/2$ (ii)

$(R0+\alpha\times R1)<-(1+\alpha)^2/2$ (iii)

$(R0+\alpha\times R1-R2))<-\alpha^2/2$ (iv)

group (h)

$(R0+(1+\alpha)\times(R1+R2))<(-\frac{1}{2}-(1+\alpha^2))$ (i)

$(R0+(1+\alpha)\times(R1+R2))<-(1+\alpha^2)$ (ii)

$(R0+\alpha\times R1+R2)<-(1+\alpha)^2+\alpha^2/2$ (iii)

$(R0+\alpha\times R1)<-(1+\alpha)^2$ (i).

25. The method of claim 24 wherein said method decodes a 1 if at the kth time step the encoder is in state −1 and if all the four inequalities (i–iv) in at least one of the below defined groups i and j and k and l, are true:

group (i)

$(R0+\alpha R1)<-((1+\alpha^2)/2)$ (i)

$(R0+\alpha\times R1+R2)<-((1+\alpha^2)/2)$ (ii)

$(R0+(1+\alpha)\times R1+\alpha\times R2))<-\alpha$ (iii)

$(R0+(R1+R2)\times(1+\alpha))<+\frac{1}{2}$ (iv)

group (j)

$(R0+\alpha\times R1-R2)<-(((1+\alpha^2)/2)+\frac{1}{2})$ (i)

$(R0+\alpha\times R1)<-((1+\alpha^2)2)$ (ii)

$(R0+(1+\alpha)\times R1-(1-\alpha)\times R2))>-((1+2\times\alpha)/2)$ (iii)

$(R0+(1+\alpha)\times R1+\alpha\times R2))>0$ (iv)

group (k)

$(R0+(1+\alpha)\times R1+\alpha\times R2)<-((1+\alpha)^2)$ (i)

$(R0+(1+\alpha)\times(R1+R2))<-(\frac{1}{2}+\alpha^2+2\times\alpha)$ (ii)

$(R0+(2+\alpha)\times R1+2\times\alpha\times R2)\times 2<-(1+\alpha^2+4\times\alpha)$ (iii)

$(R0+(2+\alpha)\times R1+(1+2\times\alpha)\times R2)\times 2<-(\alpha^2+2\times\alpha)$ (iv)

group (l)

$(2\times R0+2\times(1+\alpha)\times(R1+R2))>-(3\times(1+\alpha^2)-\alpha^2)$ (i)

$(2\times R0+2\times(1+\alpha)\times(R1+R2)+2\times(2+\alpha)\times R2)<-(3\times(1+\alpha^2)-1+\alpha^2)$ (ii)

$(2\times R0+2\times(1+\alpha)\times R1+2\times(2+\alpha)\times R2)<-(\alpha^2/2+3\times\alpha+1)$ (iii)

$(R0+(2+\alpha)\times R1+2\times(2+\alpha)\times R2)<-(\alpha^2+5)/2$ (iv).

26. The method of claim 24 wherein said method decodes a 1 if at the kth time step the encoder is in state −1 and if all the four inequalities (i–iv) in at least one of the below defined groups m and n and o and p, are true:

group (m)

$(R0+\alpha R1)>((1+\alpha^2)/2)$ (i)

$(R0+\alpha\times R1-R2)>\alpha^2/2$ (ii)

$(R0+(1-\alpha)\times R1+\alpha\times R2))>0$ (iii)

$(R0-(1-\alpha)\times R1-(1+\alpha)\times R2)>-(1+2\times\alpha)/2$ (iv)

group (n)

$(R0+\alpha\times R1-R2)<-((2+\alpha^2)/2+\frac{1}{2})$ (i)

$(R0+\alpha\times R1-2\times R2)<((1+\alpha^2)/2)$ (ii)

$(R0-(1-\alpha)\times R1-(1+\alpha)\times R2))>\frac{1}{2}$ (iii)

$(R0-(1-\alpha)\times R1-(2+\alpha)\times R2))>-\alpha$ (iv)

group (o)

$(R0+(1+\alpha)\times R1+\alpha\times R2)<-(1+\alpha^2+(1+\alpha)^2)$ (i)

$(R0+(1+\alpha)\times R1-(1-\alpha)\times R2)>-(\alpha^2+(1+\alpha)^2)/2$ (ii)

$(R0+\alpha\times R1)>(1+\alpha)^2/2$ (iii)

$(R0+\alpha\times R1-R2))>\alpha^2/2$ (iv)

group (p)

$(R0+(1+\alpha)\times(R1+R2))<(-\frac{1}{2}-(1+\alpha^2))$ (i)

$(R0+(1+\alpha)\times(R1+R2))<-(1+\alpha^2)$ (ii)

$(R0+\alpha\times R1+R2)<-((1+\alpha)^2+\alpha^2/2)$ (iii)

$(R0+\alpha\times R1)<-(1+\alpha)^2$ (iv).

27. In a communication system having a channel for transmitting and receiving signals, a method for decoding data at a kth time step, said method comprising the acts of:

forming a vector R having n signals comprising signals received at the receiving end at the kth time step and subsequent time steps, where n is an integer;

forming vectors Y of noise-free channel output signals, each channel output vector Y corresponding to a channel response to a different one of a permutation of n input bits, each vector Y having n signals;

decoding a 1 if a distance between vector R and at least one vector in a subset of vectors Y is shorter than a minimum value.

28. The method of claim 27 wherein said minimum value is defined as the shortest of all the distances between all the vectors in the subset and all the vectors not in the subset, wherein a distance between each two vector is defined as the sum of the square of the differences between the corresponding signals of the two vectors for each of the n time steps.

29. The method of claim 28 wherein if the sum of the square of the differences of (n−m) signals, in a Y vector in the subset and a Y vector not in the subset is greater than the minimum value, a 1 is decoded if the distance between vector R having (n−m) signals and at least one vector in the subset having (n−m) signals is shorter than the minimum value, wherein m is an integer greater than 0.

30. The method of claim 29 wherein the first signal of vector R is the signal received at the kth time step.

31. The method of claim 30 wherein said subset of vectors comprises all the Y vectors whose first signal is the channel response to a binary 1.

32. The method of claim 31 wherein said n is 3.

33. The method of claim 32 wherein said communication channel has a z-transform of $1+\alpha \times z^{-1}$, wherein $\alpha$ is a number greater than zero and less or equal to 1.

34. The method of claim 33 wherein said method decodes a 1 if at the kth time step an encoder of the communication system is in state +1 and if at least one of the following two inequalities (i–ii) is true:

$$(R0+\alpha \times R1) > ((1+\alpha)^2)/2 \qquad (i)$$

$$(R0+(1+\alpha) \times R1) > ((1+\alpha)^2 - \alpha^2/2) \qquad (ii)$$

wherein R0, R1 respectively represent signals received at time steps k, k+1.

35. The method of claim 34 wherein said method decodes a 1 if at the kth time step the encoder is in state $0^+$ and if at least one of the following three inequalities (i–iii) is true:

$$(R0+\alpha \times R1) < -(1+\alpha^2)/2 \text{ AND } (R0+(\alpha-1) \times R1 - \alpha \times R2 < 0 \qquad (i)$$

$$(R0+\alpha \times R1 - R2) < -(2+\alpha^2)/2 \qquad (ii)$$

$$(R0+\alpha \times R1) < -(1+\alpha)^2/2 \qquad (iii)$$

wherein R2 represent the signal received at k+2 time step.

36. The method of claim 35 wherein said method decodes a 1 if at the kth time step the encoder is in state −1 and if at least one of the following two inequalities (i–ii) is true:

$$R0+\alpha \times R1 < -(1+\alpha^2)/2 \qquad (i)$$

$$R0+(1+\alpha) \times R1 < (-(1+\alpha)^2 - \alpha^2/2)/2 \qquad (ii).$$

37. The method of claim 36 wherein said method decodes a 1 if at the kth time step the encoder is in state $0^-$ and if at least one of the following four inequalities (i–iv) is true:

$$R0+\alpha \times R1 > (1+\alpha^2)/2 \qquad (i)$$

$$R0+(\alpha-1) \times R1 - \alpha \times R2 > 0 \qquad (ii)$$

$$R0+\alpha \times R1 - R2 > (2+\alpha^2)/2 \qquad (iii)$$

$$R0+\alpha \times R1 > (1+\alpha)^2/2 \qquad (iv).$$

38. The method of claim 37 wherein said decoding is done using a decoder which comprises a plurality of multipliers, adders and comparators, wherein said decoder does not contain a feed-back loop.

39. In a communication system having a channel for transmitting and receiving signals, a decoder for decoding data at a kth time step, said decoder comprising:

means for forming a vector R having n signals and including a signal received at the receiving end at the kth time step; and means for decoding a 1 if the distance between vector R and at least one vector in a subset of noise-free channel output vectors each having n signals is shorter than the distance between vector R and a nearest neighbor vector of the vector in said subset, wherein said nearest neighbor vector is selected from among noise-free channel output vectors which are not part of the subset.

40. In a communication system having a channel for transmitting and receiving signals, a decoder for decoding data at a kth time step, said decoder comprising:

means for forming a vector R having n signals and including a signal received at the receiving end at the kth time step, where n is an integer; and means for decoding a 1 if the distance between vector R and at least one of the vectors in a subset of noise-free channel output vectors each having n signals is shorter than the distance between vector R and all other vectors which are not part of the subset.

41. In a communication system having a channel for transmitting and receiving signals, a decoder for decoding data at a kth time step, said decoder comprising:

means for forming a vector R having n signals and comprising signals received at the receiving end at the kth time step and subsequent time steps, where n is an integer;

forming vectors Y of noise-free channel output signals, each channel output vector Y corresponding to a channel response to a different one of a permutation of n input bits, each vector Y having n signals;

decoding a 1 if a distance between vector R and at least one vector in a subset of noise-free channel output vectors is shorter than a minimum value, wherein each channel output vector corresponds to a channel response to a different one of a permutation of n input bits and wherein each noise-free channel output vectors has n signals.

* * * * *

UNITED STATES PATENT AND TRADEMARK OFFICE
CERTIFICATE OF CORRECTION

PATENT NO. : 6,418,172 B1
DATED : July 9, 2002
INVENTOR(S) : Raghavan et al.

It is certified that error appears in the above-identified patent and that said Letters Patent is hereby corrected as shown below:

<u>Column 16, lines 54-67, through Column 22,</u>
[ ] Brackets were changed to ( ) parenthesis throughout the claims.

<u>Column 3,</u>
Line 63, delete ".'"

<u>Column 8,</u>
Line 40, delete "d" and insert -- E --.

<u>Column 19,</u>
Line 2, delete "$a^2 2xa$" and insert -- $a^2+2xa$ --.

Signed and Sealed this

Fifteenth Day of April, 2003

JAMES E. ROGAN
*Director of the United States Patent and Trademark Office*